(12) United States Patent
Hamilton

(10) Patent No.: US 9,294,911 B2
(45) Date of Patent: Mar. 22, 2016

(54) CELL-ID TRANSLATION IN A LOCATION BASED SYSTEM (LBS)

(75) Inventor: Elliott Hamilton, Hyattsville, MD (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 13/067,116

(22) Filed: May 10, 2011

(65) Prior Publication Data

US 2011/0275383 A1 Nov. 10, 2011

Related U.S. Application Data

(60) Provisional application No. 61/344,021, filed on May 10, 2010.

(51) Int. Cl.
| | | |
|---|---|---|
| *H04W 72/00* | (2009.01) | |
| *H04W 8/26* | (2009.01) | |
| *H04L 29/12* | (2006.01) | |
| *H04W 60/04* | (2009.01) | |

(52) U.S. Cl.
CPC ........... *H04W 8/26* (2013.01); *H04L 29/12584* (2013.01); *H04L 61/2596* (2013.01); *H04W 60/04* (2013.01)

(58) Field of Classification Search
CPC ....... H04W 4/22; H04W 76/007; H04W 4/02; H04W 4/06; H04M 11/04; H04M 1/72536
USPC .......... 455/39, 560, 456.1, 445, 41, 428, 410, 455/456.6, 12.1, 13.2, 429, 456.2, 446, 411, 455/426, 414.1, 436; 370/352, 329, 331
See application file for complete search history.

(56) References Cited

U.S. PATENT DOCUMENTS

| | | | |
|---|---|---|---|
| 1,103,073 | A | 7/1914 | O'Connell |
| 4,651,156 | A | 3/1987 | Martines |
| 4,706,275 | A | 11/1987 | Kamil |
| 4,891,638 | A | 1/1990 | Davis |
| 4,891,650 | A | 1/1990 | Sheffer |
| 4,952,928 | A | 8/1990 | Carroll |
| 5,014,206 | A | 5/1991 | Scribner |

(Continued)

FOREIGN PATENT DOCUMENTS

| | | |
|---|---|---|
| EP | 1111886 | 12/1999 |
| SE | WO2010/005363 | 1/2010 |
| WO | WO02/23933 | 3/2002 |

OTHER PUBLICATIONS

The Power of Mobile Unified Messaging: Siemans and Comverse to Demonstrate WAP-Based Messaging Applications on Live GPRS System, Comverse, Feb. 2000.

(Continued)

*Primary Examiner* — Joseph Arevalo
(74) *Attorney, Agent, or Firm* — Tarolli, Sundheim, Covell & Tummino LLP

(57) ABSTRACT

A Cell-ID translation module accesses a Cell-ID translation database to associate original Cell-ID information with new or changed (i.e., translated) Cell-ID information received by a handset. A Cell-ID database is effectively regularly changed rendering useless any third party databases previously collected without authorization by the relevant mobile operators. Cell-IDs collected by unauthorized third parties will either not be found in the third party database, or not match up to the correct location.

6 Claims, 3 Drawing Sheets

CELL-ID TRANSLATION DATABASE — 100

ORIGINAL OR PREVIOUS CELL-ID DATABASE

| OPERATOR CODE | AREA CODE | CELL-ID |
|---|---|---|
| 023 | 0045 | 00125 |
| 023 | 0045 | 00126 |
| 023 | 0045 | 00127 |
| 023 | 0045 | 00128 |
| 023 | 0045 | 00129 |
| 023 | 0066 | 00018 |
| 023 | 0066 | 00019 |

202

TRANSLATED CELL-ID DATABASE

| OPERATOR CODE | AREA CODE | CELL-ID |
|---|---|---|
| 023 | 0045 | 00456 |
| 023 | 0045 | 00457 |
| 023 | 0045 | 00458 |
| 023 | 0045 | 00459 |
| 023 | 0045 | 00460 |
| 023 | 0066 | 00125 |
| 023 | 0066 | 00126 |

204

(56) References Cited

U.S. PATENT DOCUMENTS

| | | | |
|---|---|---|---|
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster et al. |
| 5,265,630 A | 11/1993 | Hartmann |
| 5,266,944 A | 11/1993 | Caroll |
| 5,289,527 A | 2/1994 | Tiedemann, Jr. |
| 5,293,642 A | 3/1994 | Lo |
| 5,299,132 A | 3/1994 | Wortham |
| 5,325,302 A | 6/1994 | Izidon |
| 5,334,974 A | 8/1994 | Simms |
| 5,343,493 A | 8/1994 | Karimulah |
| 5,345,227 A | 9/1994 | Fascenda |
| 5,347,568 A | 9/1994 | Moody |
| 5,349,696 A | 9/1994 | Matai |
| 5,351,235 A | 9/1994 | Lahtinen |
| 5,353,328 A | 10/1994 | Jokimies |
| 5,361,212 A | 11/1994 | Class |
| 5,363,425 A | 11/1994 | Mufti |
| 5,374,936 A | 12/1994 | Feng |
| 5,379,031 A | 1/1995 | Mondrosch |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Caroll |
| 5,396,558 A | 3/1995 | Ishiguro et al. |
| 5,398,190 A | 3/1995 | Wortham |
| 5,406,614 A | 4/1995 | Hara |
| 5,408,513 A | 4/1995 | Buschi, Jr. |
| 5,408,519 A | 4/1995 | Pierce |
| 5,408,682 A | 4/1995 | Ranner |
| 5,412,726 A | 5/1995 | Nevoux |
| 5,418,537 A | 5/1995 | Bird |
| 5,422,813 A | 6/1995 | Schuchman |
| 5,432,841 A | 7/1995 | Rimer |
| 5,434,789 A | 7/1995 | Fraker |
| 5,438,615 A | 8/1995 | Moen |
| 5,440,621 A | 8/1995 | Castro |
| 5,452,471 A * | 9/1995 | Leopold et al. ............... 455/429 |
| 5,454,024 A | 9/1995 | Lebowitz |
| 5,457,737 A | 10/1995 | Wen |
| 5,461,390 A | 10/1995 | Hosher |
| 5,465,289 A | 11/1995 | Kennedy, Jr. |
| 5,465,401 A | 11/1995 | Thompson |
| 5,469,497 A | 11/1995 | Pierce |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,485,505 A | 1/1996 | Norman |
| 5,488,563 A | 1/1996 | Chazelle |
| 5,494,091 A | 2/1996 | Freeman |
| 5,497,149 A | 3/1996 | Fast |
| 5,502,761 A | 3/1996 | Duncan |
| 5,506,893 A | 4/1996 | Buscher |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,532,690 A | 7/1996 | Hertel |
| 5,535,434 A | 7/1996 | Siddoway |
| 5,539,398 A | 7/1996 | Hall |
| 5,543,776 A | 8/1996 | L'Esperance |
| 5,552,772 A | 9/1996 | Janky |
| 5,555,286 A | 9/1996 | Tendler |
| 5,555,446 A | 9/1996 | Jasinski |
| 5,568,119 A | 10/1996 | Schipper |
| 5,574,648 A | 11/1996 | Pilley |
| 5,579,372 A | 11/1996 | Angstrom |
| 5,588,009 A | 12/1996 | Will |
| 5,590,417 A | 12/1996 | Rydbeck |
| 5,592,535 A | 1/1997 | Klotz |
| 5,596,734 A | 1/1997 | Ferra |
| 5,604,486 A | 2/1997 | Lauro |
| 5,606,313 A | 2/1997 | Allen |
| 5,606,850 A | 3/1997 | Nakamura |
| 5,610,815 A | 3/1997 | Gudat |
| 5,615,116 A | 3/1997 | Gudat |
| 5,621,793 A | 4/1997 | Bednarek |
| 5,628,051 A | 5/1997 | Salin |
| 5,633,912 A | 5/1997 | Tsoi |
| 5,682,600 A | 10/1997 | Salin |
| 5,687,216 A | 11/1997 | Svensson |
| 5,724,667 A | 3/1998 | Furuno |
| 5,740,534 A | 4/1998 | Ayerst |
| 5,761,618 A | 6/1998 | Lynch |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,141 A * | 8/1998 | Zicker ............................ 455/418 |
| 5,794,142 A | 8/1998 | Vanttila et al. |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,822,700 A | 10/1998 | Hult |
| 5,828,740 A | 10/1998 | Khuc |
| 5,920,821 A | 7/1999 | Seaholtz |
| 5,930,701 A | 7/1999 | Skog |
| 5,943,399 A | 8/1999 | Bannister |
| 5,946,629 A | 8/1999 | Sawyer |
| 5,946,630 A | 8/1999 | Willars |
| 5,950,130 A | 9/1999 | Coursey |
| 5,953,398 A | 9/1999 | Hill |
| 5,966,663 A | 10/1999 | Gleaon |
| 5,974,054 A | 10/1999 | Couts |
| 5,978,685 A | 11/1999 | Laiho |
| 5,987,323 A | 11/1999 | Huotari |
| 5,998,111 A | 12/1999 | Abe |
| 6,011,976 A | 1/2000 | Michaels |
| 6,014,429 A | 1/2000 | LaPorta |
| 6,035,025 A | 3/2000 | Hanson |
| 6,049,710 A | 4/2000 | Nilsson |
| 6,055,413 A | 4/2000 | Morse et al. |
| 6,055,442 A | 4/2000 | Dietrich |
| 6,058,300 A | 5/2000 | Hanson |
| 6,064,875 A | 5/2000 | Morgan |
| 6,070,067 A | 5/2000 | Nguyen |
| 6,075,982 A | 6/2000 | Donovan |
| 6,081,508 A | 6/2000 | West |
| 6,085,099 A | 7/2000 | Ritter |
| 6,087,956 A | 7/2000 | Helferich |
| 6,101,378 A | 8/2000 | Barabash |
| 6,122,503 A | 9/2000 | Daly |
| 6,122,520 A | 9/2000 | Want |
| 6,125,281 A | 9/2000 | Wells |
| 6,128,482 A | 10/2000 | Nixon |
| 6,148,197 A | 11/2000 | Bridges |
| 6,148,198 A | 11/2000 | Anderson |
| 6,149,353 A | 11/2000 | Nilsson |
| 6,169,891 B1 | 1/2001 | Gorham |
| 6,173,181 B1 | 1/2001 | Losh |
| 6,181,935 B1 | 1/2001 | Gossman |
| 6,188,752 B1 | 2/2001 | Lesly |
| 6,188,911 B1 | 2/2001 | Wallentin et al. |
| 6,198,431 B1 | 3/2001 | Gibson |
| 6,199,045 B1 | 3/2001 | Giniger |

(56) References Cited

U.S. PATENT DOCUMENTS

| | | | |
|---|---|---|---|
| 6,205,330 B1 | 3/2001 | Windbladh | |
| 6,208,854 B1 | 3/2001 | Roberts | |
| 6,208,870 B1 | 3/2001 | Lorello et al. | |
| 6,223,046 B1 | 4/2001 | Hamill-Keays | |
| 6,226,529 B1 | 5/2001 | Bruno | |
| 6,249,680 B1 | 6/2001 | Wax | |
| 6,249,744 B1 | 6/2001 | Morita | |
| 6,263,212 B1 | 7/2001 | Ross | |
| 6,266,614 B1 | 7/2001 | Alumbaugh | |
| 6,289,373 B1 | 9/2001 | DeZonno | |
| 6,292,669 B1 | 9/2001 | Meuronen | |
| 6,317,594 B1 | 11/2001 | Gossman | |
| 6,327,479 B1 | 12/2001 | Mikkola | |
| 6,373,930 B1 | 4/2002 | McConnell | |
| 6,529,722 B1 | 3/2003 | Heinrich et al. | |
| 6,744,854 B2 | 6/2004 | Berrier et al. | |
| 6,744,858 B1 | 6/2004 | Ryan et al. | |
| 6,751,463 B1 | 6/2004 | Lorello et al. | |
| 6,771,742 B2 | 8/2004 | McCalmont et al. | |
| 6,771,946 B1 | 8/2004 | Oyaski | |
| 6,775,356 B2 | 8/2004 | Salvucci et al. | |
| 6,888,927 B1 | 5/2005 | Cruickshank et al. | |
| 6,922,565 B2 | 7/2005 | Rhodes et al. | |
| 7,054,659 B2 | 5/2006 | Gioscia et al. | |
| 7,142,580 B1* | 11/2006 | Balachandran et al. | 375/132 |
| 7,171,207 B2* | 1/2007 | Artola et al. | 455/445 |
| 7,450,935 B1 | 11/2008 | Link, II et al. | |
| 7,590,426 B2* | 9/2009 | Cho | 455/456.1 |
| 7,603,148 B2 | 10/2009 | Michalak | |
| 7,693,511 B2 | 4/2010 | Bottrich et al. | |
| 7,693,546 B1 | 4/2010 | Gioscia et al. | |
| 8,055,271 B2* | 11/2011 | Nair et al. | 455/456.1 |
| 8,265,326 B2 | 9/2012 | Singh | |
| 8,271,188 B2* | 9/2012 | de Koning | 701/409 |
| 8,284,980 B2 | 10/2012 | Parker et al. | |
| 8,600,349 B2* | 12/2013 | Willars et al. | 455/410 |
| 2002/0003345 A1 | 1/2002 | Stanley et al. | |
| 2002/0181681 A1 | 12/2002 | Mani | |
| 2003/0092451 A1 | 5/2003 | Holloway | |
| 2003/0122669 A1 | 7/2003 | Filippov et al. | |
| 2003/0125085 A1* | 7/2003 | Collins | 455/560 |
| 2003/0224840 A1 | 12/2003 | Frank et al. | |
| 2004/0072558 A1 | 4/2004 | Van Bosch | |
| 2004/0158371 A1 | 8/2004 | Iggulden et al. | |
| 2004/0185854 A1* | 9/2004 | Artola et al. | 455/445 |
| 2004/0190497 A1 | 9/2004 | Knox | |
| 2004/0198332 A1 | 10/2004 | Lundsgaard | |
| 2004/0203692 A1 | 10/2004 | Schwinke et al. | |
| 2004/0203728 A1 | 10/2004 | Schwinke et al. | |
| 2005/0009576 A1 | 1/2005 | Van Bosch | |
| 2005/0054335 A1 | 3/2005 | Pearson | |
| 2005/0080519 A1 | 4/2005 | Oesterling et al. | |
| 2005/0090236 A1 | 4/2005 | Schwinke et al. | |
| 2005/0107132 A1 | 5/2005 | Kamdar et al. | |
| 2005/0169249 A1* | 8/2005 | Shirota et al. | 370/352 |
| 2005/0201357 A1 | 9/2005 | Poyhonen | |
| 2005/0260994 A1 | 11/2005 | Losch | |
| 2005/0265536 A1 | 12/2005 | Smith | |
| 2006/0007920 A1 | 1/2006 | Michel et al. | |
| 2006/0092023 A1 | 5/2006 | Hofbeck et al. | |
| 2007/0066303 A1* | 3/2007 | Ala-Luukko | 455/436 |
| 2007/0191013 A1 | 8/2007 | Gunnarsson | |
| 2008/0189028 A1* | 8/2008 | Nair et al. | 701/200 |
| 2008/0200182 A1* | 8/2008 | Shim | 455/456.1 |
| 2009/0170477 A1* | 7/2009 | Bensimon et al. | 455/411 |
| 2010/0093358 A1 | 4/2010 | Cheong | |
| 2010/0099389 A1* | 4/2010 | Zhu et al. | 455/414.1 |
| 2010/0216426 A1* | 8/2010 | Karim et al. | 455/410 |
| 2010/0227609 A1* | 9/2010 | Bot et al. | 455/426.1 |
| 2010/0330903 A1* | 12/2010 | Chabrerie | 455/39 |
| 2011/0038326 A1* | 2/2011 | Davies et al. | 370/329 |
| 2011/0219226 A1* | 9/2011 | Olsson et al. | 713/150 |

OTHER PUBLICATIONS

ETSI/3Gpp, 3$^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.

ETSI,3GPP, 3$^{rd}$ Generation Partnership Project; Technical Specification Group Core Network; Customized Applications for Mobile network Enhanced Logic; (CAMEL) Phase 3—Stage 2 (3G TS 23.078 version 3.3.0), Dec. 199, pp. 300-329.

Bond, "Cellular Carriers Use Prepaid Programs to Reach Untapped Markets," Billing World, Mar. 1997, pp. 14-17.

Freedom Wireless, "The Freedom to Chose! Get Pre-Pay Cellular," sales pamphlet, undated.

MultiMedia Publishing Corp., "Prepaid Cellular and Prepaid Wireless Market Report and Forecast 1997-2002," sales literature, undated.

NEXTLINK, "Introducing a New Prepaid Telephone Service from NEXTLINK," sales literature, undated.

Open Development Corp., "openMedia Cellular Prepaid," sales literature, undated.

Tecore, Inc., "Pre-Paid Cellular," sales literature, Mar. 25, 1997, pp. 1-4.

European Search Report in European Patent Appl. No. 06825958.9 dated Sep. 20, 2010.

International Search Report in PCT/US2011/000817 dated Sep. 12, 2011.

International Search Report in PCT/US2011/000817 dated Apr. 26, 2012.

International Preliminary Report on Patentability in PCT/US2011/000817 dated Nov. 22, 2012.

International Search Report for Application No. PCT/US2006/38946, mailed on Jul. 26, 2007, 1 page.

* cited by examiner

CELL-ID TRANSLATION IN A LOCATION BASED SYSTEM (LBS)

This patent application claims priority from U.S. Provisional No. 61/344,021, filed May 10, 2010, entitled "CELL ID IDENTIFICATION IN A LOCATION BASED SYSTEM (LBS)" to Elliott Hamilton, the entirety of which is expressly incorporated herein by reference.

BACKGROUND OF THE INVENTION

1. Field of the Invention

This invention relates generally to wireless telecom, and in particular to location based systems (LBS).

2. Background of Related Art

The current location of wireless devices at any given time, or even past locations of wireless devices, is commercially valuable information. However, while it provides an important tool to commercial enterprises (e.g., for use in marketing), it also raises privacy concerns. Significant rules and standards have been established in the wireless device industry to protect a user's privacy, e.g., a user of a wireless device typically may choose to enable or disable location of that wireless device giving the user an ability to choose to permit location of their device in the first place. With permitted use of location technology, a mobile operator or carrier then has the ability to make use of such location information, including sale of such location information, subject to respective permissions of its subscribers. As a result, mobile operators and carriers enjoy significant revenue from the sale or license of location information of its subscribers, thus defraying the cost of the network, ultimately benefitting the subscribers.

A cell site in a particular mobile operator's network has a unique identifier code associated with the cell site—referred to as a Cell-ID. This Cell-ID is usually provided by the Radio Network Controller (RNC). Depending upon the operator, Cell-IDs transmitted to proximate mobile devices are associated with an area ID or Cell Name to form a unique identifier. However, a phone in range of a given cell site can receive the Cell-ID, the Area ID and the Operator ID.

Third parties such as Google(TM) have devised techniques to sniff out and record Cell-ID information, and cross-referencing that sniffed Cell-ID information to known locations, to identify a general location of mobile operators Cell-IDs. Google(™), for example, has collected a Cell-ID database that it provides to developers so applications on handsets can determine the approximate location of the user. In addition, Google(™) uses the database to provide more precise location technology in conjunction with its own Assisted GPS server. This provides a technique that determines a general location based on the Cell-ID that the wireless device receives from the network. This bypasses the mobile operator, and deprives them of an important source of revenue, ultimately putting pressure on the mobile operator resulting in raised costs to the subscriber.

In particular, third parties such as Google(™) have independently mapped operators' cell site information by associating a location (longitude and latitude) with a Cell Site identifier code—Cell-ID. Each mobile operator's cell site provides a unique identifier code that is received by a handset, sometimes in conjunction with an Area ID code as well. Thus, knowing the Cell-ID and Area ID for a particular mobile operator, a third party can associate an approximate location with the Cell-ID. This is usually accomplished by having a client in a GPS enabled handset that receives the Cell-ID information, and associating the Cell-ID information to the GPS location of the handset. As a result, third party providers can then provide location information to applications, handsets, etc. without the direct involvement of the mobile operator, making a revenue stream for themselves previously enjoyed by mobile operators. Perhaps more importantly, the location information is obtained by such third parties who may not have a contractual obligation to those users to maintain a privacy in that location information.

Cell-ID information may be used to provide precise location information when used in conjunction with assisted GPS servers. The location of a given wireless device, whether imprecise or precise, may be determined without the direct assistance of the relevant mobile operator.

Without the need to rely on mobile operators for provision of location of given wireless devices, third parties need not pay the relevant mobile operators for location data. Thus, mobile operators are excluded from the value chain for location information, missing out on significant revenue. And perhaps more important to the users themselves, private information of the user, i.e., their location, cannot be controlled as third parties have the ability to determine a location of subscribers who are not their subscribers, thus raising serious privacy concerns.

SUMMARY OF INVENTION

In accordance with the principles of the present invention, a method of securing Cell-ID information in a wireless network comprises translating a unique static Cell-ID of a node in a wireless network into a unique, regularly changed, translated Cell-ID. The translated Cell-ID and not the static Cell-ID is transmitted to a wireless device communicating with the node of the wireless network.

In accordance with another aspect of the invention, a network Cell-ID translation apparatus comprises a Cell-ID translation database containing a plurality of translations between respective unique static Cell-IDs of nodes in a wireless network, and temporarily corresponding unique, regularly changed, translated Cell-IDs. A changer of Cell-IDs module, in communication with the Cell-ID translation database, occasionally affects a change in the value of the translated Cell-IDs. A translated Cell-ID and not the static Cell-ID, is transmitted to a wireless device communicating with an assigned node in the wireless network.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
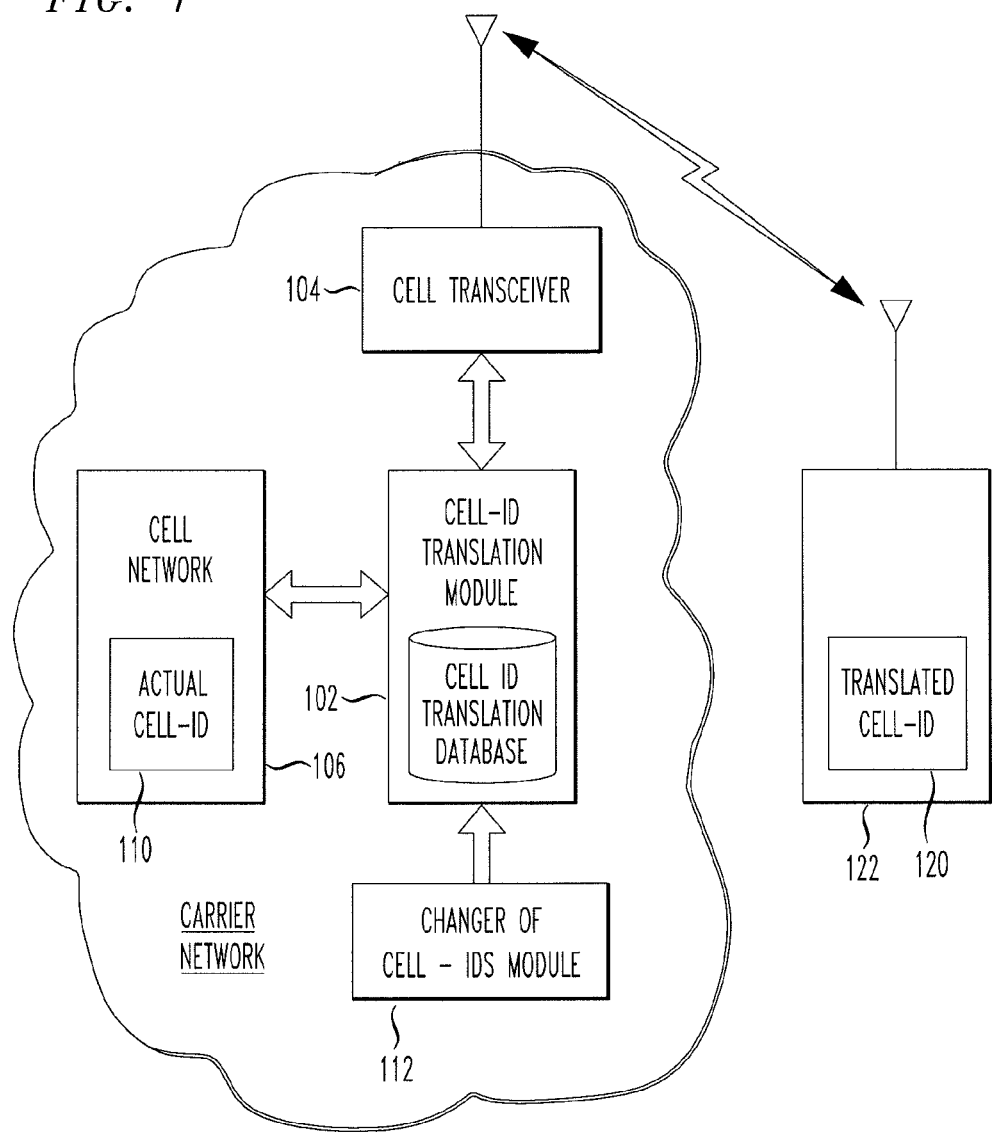
FIG. 1 shows an exemplary carrier network including a Cell-ID translation module accessing a Cell-ID translation database, in accordance with the principles of the present invention.

FIG. 1 shows an exemplary carrier network including a Cell-ID translation module accessing a Cell-ID translation database, in accordance with the principles of the present invention.

In particular, as shown in FIG. 1, a Cell-ID Translation Module 102 resides on a suitable server. The Cell-ID translation module 102 accesses a Cell-ID translation database 100 to associate original Cell-ID information with new or changed (i.e., translated) Cell-ID information 120 received by a handset 122.

The Cell-ID translation database 100 may be changed by the mobile operator on a periodic, intermittent, or otherwise occasional basis of the mobile operator's choosing. The mobile operator changes the Cell-ID translation database using an appropriate changer of translated Cell-IDs module 112. Via the changer of translated Cell-IDs module 112, an authorized mobile operator may change any or all translation values of Cell-IDs as they are presented to wireless devices 122, thus rendering useless any previous third party databases associating conventional static Cell-IDs with a general location as were collected in the past.

The Cell-ID translation database 100 may be contained on a server, and function to associate new (i.e., translated) Cell-IDs with the previous or original Cell-IDs. In one embodiment, the mobile operator can change the translated Cell-ID information 120 that is received by the handset 122 on a periodic or other occasional basis of the mobile operator's choosing. The Cell-ID translation database 100 may be established on an entire network basis, or on a regional or specific geographic area basis.

The changer of translated Cell-IDs module 112 may change the translation of the Cell-IDs based on a known method or algorithm, or otherwise methodical fashion thus permitting a mobile operator the ability to again gain revenue by selling translated Cell-ID information to third parties or partners of its own choosing. This not only defrays costs to the mobile operator, but also permits the mobile operator to hold such third parties to privacy standards via contractual or other methods.

Figure 2:
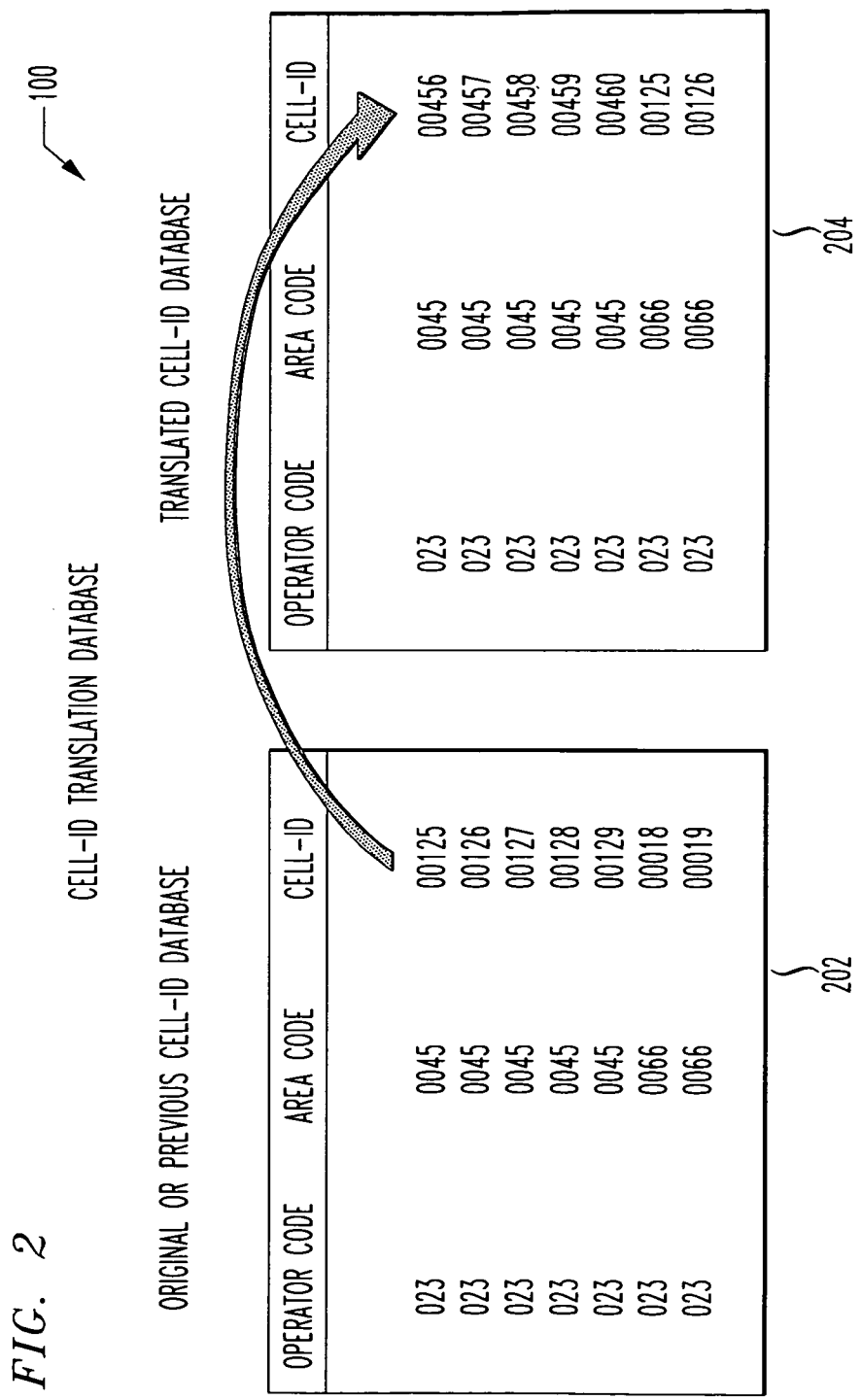
FIG. 2 shows a Cell-ID translation database associating an original or previous Cell-ID with a new Cell-ID, in accordance with the principles of the present invention.

FIG. 2 shows a Cell-ID translation database associating an original or previous Cell-ID with a new Cell-ID, in accordance with the principles of the present invention.

In particular, as shown in FIG. 2, the Cell-ID translation database 100 contains entries translating an original, otherwise conventional, previous or otherwise static Cell-ID database 202 to an effectively translated Cell-ID database 204. As shown in FIG. 2, translated Cell-IDs are shown for an exemplary mobile operator identified as "023".

Figure 3:
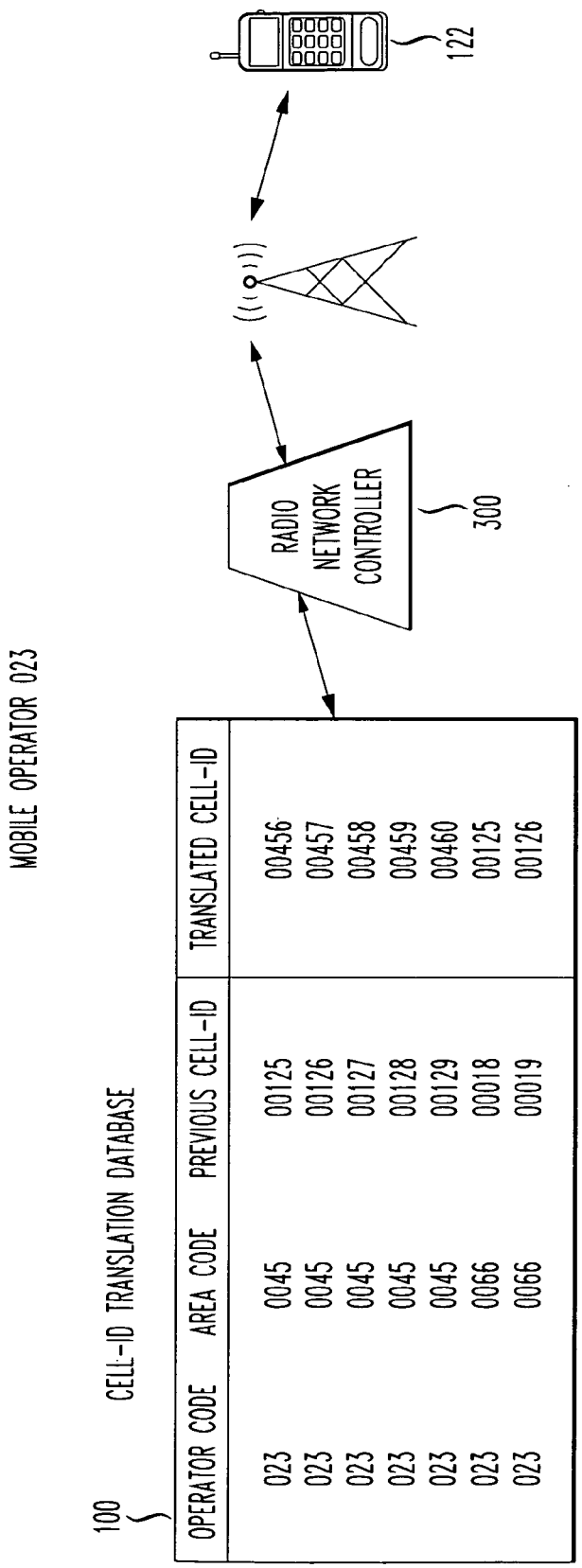
FIG. 3 shows a Cell-ID translation database in a network providing mapping between a previous Cell-ID and a new Cell-ID, for use by a radio network controller to provide a new Cell-ID to a relevant mobile device, in accordance with the principles of the present invention.

FIG. 3 shows a Cell-ID translation database in a network providing mapping between a previous Cell-ID and a new Cell-ID, for use by a radio network controller to provide a new Cell-ID to a relevant mobile device, in accordance with the principles of the present invention.

In particular, as shown in FIG. 3, mobile operator "023" has its Cell-IDs masked, thus protecting not only a significant source of revenue but also control of the privacy of its subscribers' locations, using the Cell-Id Translation database 100. Translated Cell-IDs, not the static Cell-IDs permanently assigned to respective cells, are passed to wireless devices 122 via the mobile operator's radio network controller 300.

Using the present invention which effectively regularly changes the Cell-ID database, any third party databases previously collected without authorization by the relevant mobile operators are rendered useless because Cell-IDs collected by unauthorized third parties will be changed such that the previously sniffed Cell-IDs will either not be found in the third party database, or not match up to the correct location.

The present invention may also be applied to other wireless networks such as WiFi networks that may be managed or controlled by an operator. The present invention has applicability to the mobile operator market in general. Moreover, companies that maintain a database that matches location of a WiFi device with a WiFi identification code—typically called a Media Access Control (MAC) address—will also benefit from the invention.

While the invention has been described with reference to the exemplary embodiments thereof, those skilled in the art will be able to make various modifications to the described embodiments of the invention without departing from the true spirit and scope of the invention.

What is claimed is:

1. A method of securing cell site identifier code information in a wireless network, comprising:
    accessing a secure cell site identifier code translation database containing regularly changed translations between actual, unique static cell site identifier code information, and corresponding translated, unique static cell site identifier code information; and
    regularly translating an actual, unique static cell site identifier code associated with a given wireless device in a wireless network into its corresponding current translated, unique static cell site identifier code, while leaving said actual, unique static cell site identifier code associated with said given wireless device unchanged;
    wherein a regularly changed, translated cell site identifier code, in place of said unique static Cell-ID associated with said given wireless device, is passed to another wireless device.

2. The method of securing cell site identifier code information in a wireless network according to claim 1, wherein:
    said corresponding translated, unique static cell site identifier code is changed periodically.

3. The method of securing cell site identifier code information in a wireless network according to claim 1, wherein:
    said corresponding translated, unique static cell site identifier code is changed intermittently.

4. A network translation apparatus, comprising:
    a secure cell site identifier code translation database containing a plurality of regularly changed translations between actual, unique static cell site identifier codes of given nodes in a wireless network, and corresponding translated, unique static cell site identifier codes;
    a translator, in communication with said cell site identifier code translation database, to regularly replace, in a communication with but not in said given nodes in said wireless network itself, an actual, unique static cell site identifier code with its corresponding regularly changed, translated, unique static cell site identifier code, while leaving said actual, unique static cell site identifier codes unchanged; and
    a transmitter to transmit a regularly changed, translated cell site identifier code, in place of said actual, unique static cell site identifier code associated with a given node in said wireless network, to a device outside said wireless network.

5. The network cell site identifier code translation apparatus according to claim 4, wherein:
    said translator of said actual, unique static cell site identifier code periodically changes said translated, unique static cell site identifier code.

6. The network cell site identifier code translation apparatus according to claim 4, wherein:
    said translator of said actual, unique static cell site identifier code intermittently changes said translated, unique static cell site identifier code.

* * * * *